United States Patent [19]

Alonso

[11] 4,068,032

[45] Jan. 10, 1978

[54] METHOD OF TREATING CONDUCTIVE ELASTOMERS

[75] Inventor: Oscar Alonso, Westminster, Calif.

[73] Assignee: International Telephone and Telegraph Corporation, New York, N.Y.

[21] Appl. No.: 742,675

[22] Filed: Nov. 17, 1976

[51] Int. Cl.$^2$ .............................................. B01J 1/12
[52] U.S. Cl. ................................. 428/195; 156/73.1; 264/23; 264/68; 264/108; 310/313
[58] Field of Search ...................... 428/195; 200/265; 310/313; 264/23, 68, 108; 156/73.1

[56] References Cited

U.S. PATENT DOCUMENTS

| 3,648,002 | 3/1972 | DuRocher | 200/265 |
| 3,885,173 | 5/1975 | Lee | 310/313 |

*Primary Examiner*—Benjamin R. Padgett
*Assistant Examiner*—Irwin Gluck
*Attorney, Agent, or Firm*—Thomas L. Peterson

[57] ABSTRACT

A selected region of a conductive elastomer is made relatively nonconductive by subjecting said region to ultrasonic vibration and pressure.

6 Claims, 3 Drawing Figures

METHOD OF TREATING CONDUCTIVE ELASTOMERS

BACKGROUND OF THE INVENTION

The present invention relates generally to conductor filled elastomers and, more particularly, to a method of treating such elastomers to render selected regions thereof relatively nonconductive.

It is well known in the art to use conductive elastomer electrical connectors for interconnecting display panels to logic circuits in digital computers and wrist watches. Reference is made to U.S. Pat. No. 3,648,002 to DuRocher and U.S. Pat. No. 3,680,037 to Nellis which disclose conductive elastomer connectors in which conductive elastomer pads or contacts are mounted in openings in nonconductive elastomer retainers. The pads are formed of a resiliently compressible, electrically nonconductive elastomers having discrete, electrically conductive particles dispersed therethrough. The particles may be carbon black or metal, such as copper, nickel, or silver, or a combination of the same. The preferred elastomer is silicone rubber because of its long term stability and relatively low compression set. The conductive particles are responsive to compression of the pads to establish electrically conductive paths through the pads. U.S. Pat. No. 3,885,173 to Lee discloses a conductive elastomer connector in the form of a silicone rubber gasket having selected regions impregnated with silver.

In DuRocher, the nonconductive retainer is initially molded with openings therein, or molded as a solid disc and the openings are formed later. Thereafter, the openings are filled with silicone rubber having conductive particles dispersed therethrough which form the conductive pads or contacts of the connector. In the Nellis patent, the conductive elastomer contacts are precisely arranged in a mold and the voids therearound are filled with a flowable resin, such as silicone rubber, which forms the retainer for the contacts. While Lee does not disclose the method of forming his connector, presumably it is formed in the same manner as taught by Nellis.

It will be appreciated that in the prior art connector structures employing conductive elastomers as contacts, separate nonconductive retainers must be formed to receive the conductive contacts, or must be molded around the contacts. It is the purpose of the present invention to provide a method of treating selected regions of a conductive elastomer so as to render such regions relatively nonconductive, thus avoiding the requirement of making separate insulative retainers or substrates for discrete conductor filled elastomer contacts.

SUMMARY OF THE INVENTION

According to the principal aspect of the present invention, it has been discovered that by subjecting a selected region of a metal particle filled elastomer to ultrasonic vibration and pressure, such region will be rendered nonconductive. It will be appreciated that this method is extremely inexpensive and simple, and allows a very wide variety of patterns of conductive regions to be provided in an elastomer. Therefore, the present invention is useful for making a variety of electrical connectors, switches, electronic matrices, etc., without the costs which are incurred in present methods of molding and assembling various parts and materials.

DESCRIPTION OF THE PREFERRED EMBODIMENTS

Figure 1:
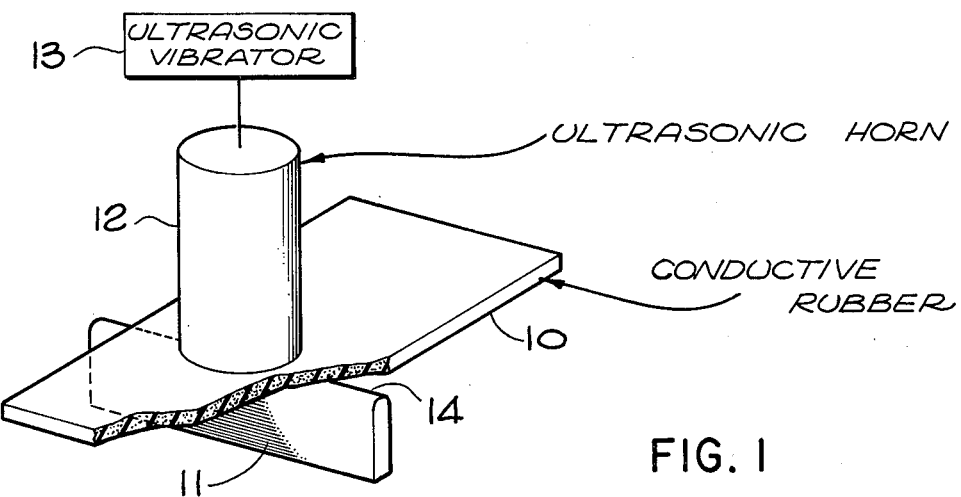
FIG. 1 is a schematic perspective view of one form of an apparatus for practicing the method of the present invention.

The term "metal particle filled elastomer" utilized in this specification and the claims hereto is intended to mean a compressible nonconductive elastomer filled with metal particles, which becomes electrically conductive when compressed as described hereinabove and disclosed in detail in the aforementioned DuRocher and Nellis patents. Also, the term is intended to include an elastomer sufficiently loaded with metal particles that it is electrically conductive even without compression.

I have discovered that when a sheet of metal particle filled elastomer is subjected to ultrasonic vibration and pressure in a selected region, such region becomes relatively nonconductive, thereby forming an isolating barrier between the regions of the sheet that are not so treated. While I do not wish to be bound by any particular theory, I believe that the treated region of the elastomer become nonconductive because the metal particles in such region dislocate or migrate out of the region, thereby interrupting the mechanical contact of the particles in the region.

In a preferred embodiment of the invention, the conductive elastomer comprises a silicone rubber sheet filled with silver-coated glass spheres and silver flakes in combination, or silver-coated glass spheres alone. By way of example only, I have subjected narrow regions extending across such conductor filled sheets, having a thickness between 0.020 inch and 0.041 inch, to ultrasonic vibration at a frequency of 20,000 Hz and at a pressure between 1,000 and 5,000 psi for three to five seconds utilizing a forming tool. By so treating said conductive rubber sheets, isolating barriers of 50–1,000 megohms were produced in the areas where the forming tool was applied to the sheets. The silver-coated glass spheres which I used had diameters of about 50 $\mu$. The preferred conductive elastomer comprised, in parts by weight, 20 silicone rubber, 40 silver-coated spheres and five silver flakes.

The frequency of ultrasonic vibrations, the pressure applied to the barrier forming tool, and the time required to render a region of the conductor filled elastomer nonconductive depends upon the density of the conductive fillers or particles and their concentration in the rubber sheet. For example, I have subjected a silicone rubber sheet filled with silver flakes alone, to ultrasonic vibrations at the frequency and pressures stated above without a significant reduction in the conductivity of the region treated. However, I believe that with suitable equipment capable of producing a higher level of ultrasonic vibration, and/or with higher pressures, the conductivity of the region treated would be reduced.

I have also applied ultrasonic vibration and pressure to silicone rubber sheets filled with carbon black without any noticeable reduction of conductivity resulting. I believe that carbon filled elastomers are not suitable for use in the present invention because of the low density of carbon black and its fragility. I believe that because of the fragility of carbon black, it becomes more finely divided when subjected to ultrasonic vibration. Therefore, the particles remain in contact and, hence, the region treated retains its conductivity.

From the foregoing, it will be appreciated that in the present invention it is preferred that the conductive elastomer be filled with relatively dense metallic particles, such as silver-coated glass spheres either alone or in combination with silver flakes. However, I believe that the method is capable of reducing conductivity of elastomers containing other metallic particles if an ultrasonic transducer is utilized which produces sufficiently higher levels of ultrasonic vibrations to cause the particles to dislocate and migrate in the elastomer. Due to their high conductivity and density, copper or nickel particles could be used in the elastomer, although other metals may certainly be suitable.

Reference is made to the drawing which illustrates three arrangements of apparatus for subjecting a conductor filled elastomer sheet 10 to ultrasonic vibration. In FIG. 1, the sheet 10 is disposed between a forming tool 11 and an ultrasonic horn 12 of an ultrasonic vibrator 13. The horn 12 illustrated is a solid cylindrical rod having a flat bottom surface while the tool 11 is in the form of a flat blade disposed vertically under the horn. When the vibrator 13 is energized, the ultrasonic energy from the horn 12 is imparted to the forming tool 11, which produces an isolation barrier extending transversely of the rubber strip 10. It is noted that the upper edge 14 of the tool 11 is rounded. Such an apparatus was utilized in the tests described previously herein.

Figure 2:
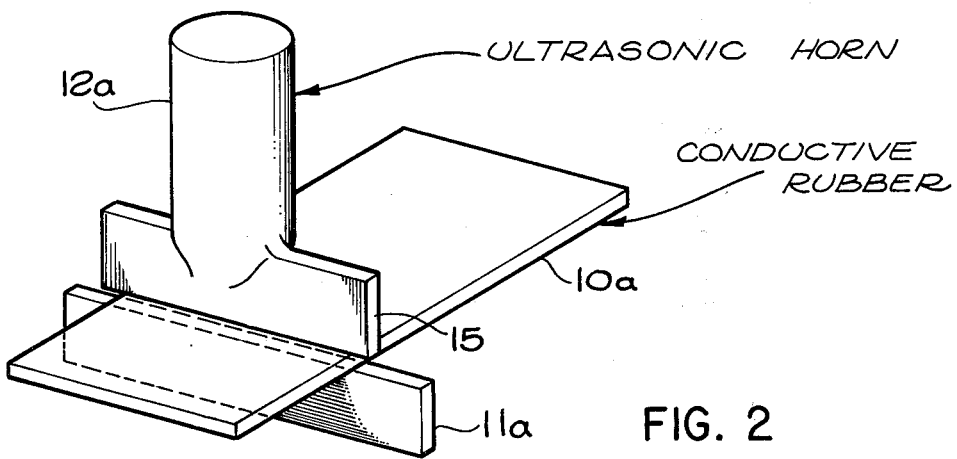
FIG. 2 is a perspective schematic illustration of an alternative form of such an apparatus.
Figure 3:
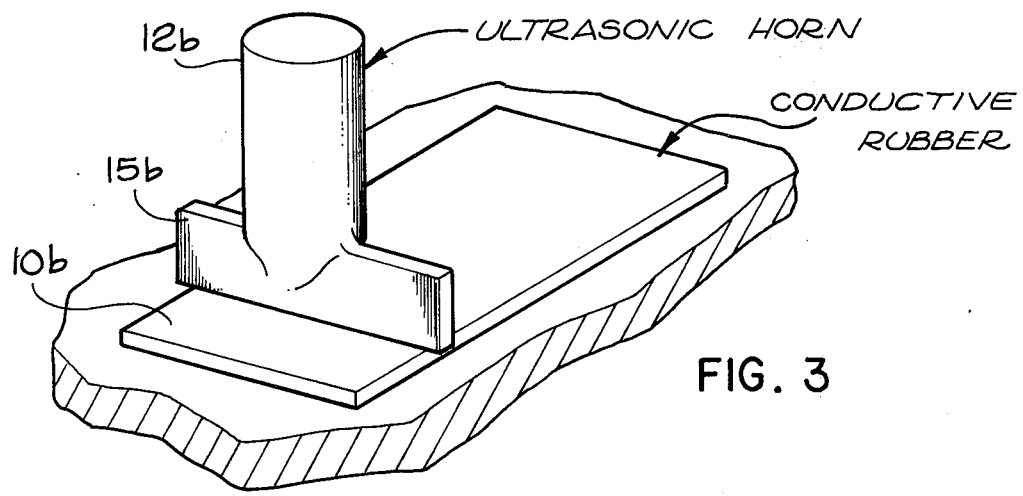
FIG. 3 is a perspective schematic illustration of a third form of such an apparatus.

In the arrangement illustrated in FIG. 2, the conductive rubber strip 10a is disposed between two vertically aligned, flat tools 11a and 15. The tool 15 is integrally joined to the horn 12a. It is noted that the opposed edges of the tools 11a and 15 which engage the conductive strip 10a are flat. In FIG. 3, the conductive rubber strip 10b is mounted on a flat support 16. The tool 15b on the horn 12b is mounted transversely of the strip 10b.

While the tools illustrated in the drawing are designed to produce simply a straight isolating barrier across an elastomer strip, it will be appreciated that by the use of suitably shaped tools, various patterns of nonconductive regions can be provided in a conductive elastomer sheet, providing an arrangement not unlike a printed circuit board. Thus, by the present invention, in a very simple and inexpensive manner, a wide variety of isolating barriers may be formed in metal particle filled elastomers.

What is claimed is:
1. A method of making a selected region of a metal particle-filled elastomer relatively nonconductive comprising the steps of:
   subjecting said selected region to ultrasonic vibration and pressure; and
   maintaining said region subjected to said ultrasonic vibration and pressure for a sufficient time until the electrical conductivity of said region is substantially reduced.
2. A method as set forth in claim 1 wherein:
said elastomer contains silver-coated glass spheres.
3. A method as set forth in claim 2 wherein:
said elastomer also contains silver flakes.
4. A method as set forth in claim 1 wherein:
said elastomer contains glass spheres coated with a noble metal.
5. A method as set forth in claim 1 wherein:
said elastomer contains particles of metal selected from the group consisting of silver, copper and nickel.
6. A conductor filled elastomer which has been treated by the process of claim 1.

* * * * *